US012624262B2

(12) United States Patent (10) Patent No.: US 12,624,262 B2
Koch et al. (45) Date of Patent: May 12, 2026

(54) HIGH MODULUS, TOUGHENED ONE-COMPONENT EPOXY STRUCTURAL ADHESIVES WITH HIGH ASPECT RATIO FILLERS

(71) Applicant: DDP SPECIALTY ELECTRONIC MATERIALS US, LLC, Wilmington, DE (US)

(72) Inventors: Felix Koch, Altendorf (CH); Sergio Grunder, Zürich (CH); Andreas Lutz, Galgenen (CH)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 268 days.

(21) Appl. No.: 18/528,894

(22) Filed: Dec. 5, 2023

(65) Prior Publication Data

US 2024/0110085 A1 Apr. 4, 2024

Related U.S. Application Data

(63) Continuation of application No. 17/035,996, filed on Sep. 29, 2020, now abandoned, which is a continuation of application No. 15/755,080, filed as application No. PCT/US2016/049604 on Aug. 31, 2016, now abandoned.

(60) Provisional application No. 62/216,401, filed on Sep. 10, 2015.

(51) Int. Cl.
| | |
|---|---|
| *C09J 163/00* | (2006.01) |
| *C08G 18/69* | (2006.01) |
| *C08G 18/80* | (2006.01) |
| *C08G 59/40* | (2006.01) |
| *C08G 59/50* | (2006.01) |
| *C08K 7/04* | (2006.01) |
| *C08L 75/04* | (2006.01) |
| *C09J 11/04* | (2006.01) |
| *C09J 11/06* | (2006.01) |

(52) U.S. Cl.
CPC .......... *C09J 163/00* (2013.01); *C08G 18/698* (2013.01); *C08G 18/8067* (2013.01); *C08G 59/5033* (2013.01); *C08K 7/04* (2013.01); *C08L 75/04* (2013.01); *C09J 11/04* (2013.01); *C09J 11/06* (2013.01); *C08G 59/4021* (2013.01); *C08G 59/5073* (2013.01); *C09J 2400/12* (2013.01); *C09J 2400/20* (2013.01); *C09J 2475/00* (2013.01)

(58) Field of Classification Search
CPC . C09J 163/00; C09J 11/04; C09J 11/06; C09J 2400/12; C09J 2400/20; C09J 2475/00; C08G 18/698; C08G 18/8067; C08G 59/4021; C08G 59/5033; C08G 59/5073; C08K 7/04; C08L 75/04

USPC ........................................................ 523/400
See application file for complete search history.

(56) References Cited

U.S. PATENT DOCUMENTS

| | | | |
|---|---|---|---|
| 3,686,359 | A | 8/1972 | Soldatos et al. |
| 4,701,378 | A | 10/1987 | Bagga et al. |
| 4,734,332 | A | 3/1988 | Bagga et al. |
| 5,112,932 | A | 5/1992 | Koenig et al. |
| 5,202,390 | A | 4/1993 | Mulhaupt et al. |
| 5,278,257 | A | 1/1994 | Mulhaupt et al. |
| 7,615,595 | B2 | 11/2009 | Lutz et al. |
| 8,673,108 | B2 | 3/2014 | Liang et al. |
| 2005/0070634 | A1 | 3/2005 | Lutz et al. |
| 2005/0209401 | A1 | 9/2005 | Lutz et al. |
| 2006/0276601 | A1 | 12/2006 | Lutz et al. |
| 2008/0251202 | A1 | 10/2008 | Eagle et al. |
| 2010/0019539 | A1 | 1/2010 | Nakamura et al. |
| 2010/0130655 | A1 | 5/2010 | Agarwal et al. |
| 2011/0024039 | A1 | 2/2011 | Campbell et al. |
| 2011/0126980 | A1 | 6/2011 | Campbell |
| 2011/0152408 | A1* | 6/2011 | Cunningham ....... C09D 151/04 |
| | | | 427/398.1 |
| 2011/0313082 | A1* | 12/2011 | Popp ...................... C09J 163/00 |
| | | | 156/330 |
| 2013/0220677 | A1 | 8/2013 | Amou et al. |
| 2015/0204403 | A1 | 7/2015 | Smeets et al. |
| 2016/0122942 | A1 | 5/2016 | Quaresma Ribeiro Campos et al. |

FOREIGN PATENT DOCUMENTS

| | | |
|---|---|---|
| CN | 101679828 A | 3/2010 |
| CN | 102037050 A | 4/2011 |
| CN | 103289629 A | 9/2013 |
| EP | 0197892 | 3/1986 |
| EP | 0308664 | 8/1988 |
| EP | 1498441 | 1/2005 |
| EP | 1916269 | 10/2006 |
| EP | 1728825 | 12/2006 |
| EP | 1916270 | 4/2008 |

(Continued)

OTHER PUBLICATIONS

Wu, "Epoxy Enhanced by Recycled Milled Carbon Fibres in Adhesively-Bonded CFRP for Structural Strengthening", Polymers, 2014, vol. 6, p. 76-92.

(Continued)

*Primary Examiner* — David T Karst

(57) ABSTRACT

One-component toughened epoxy structural adhesives contain fibrous mineral fillers that have an aspect ratio of ≥6. The presence of the fibrous filler leads to a significant increase in elastic modulus while having little if any adverse effect on other properties such as dynamic impact peel resistance.

16 Claims, No Drawings

(56)                    References Cited

FOREIGN PATENT DOCUMENTS

| EP | 1916272 | 4/2008 |
|----|---------|--------|
| EP | 1916285 | 4/2008 |
| EP | 1896517 | 11/2012 |
| EP | 1632533 | 4/2013 |
| JP | 1993163475 | 6/1993 |
| JP | H05-163475 A | 6/1993 |
| JP | 1998017770 | 1/1998 |
| JP | H10-17770 A | 1/1998 |
| JP | 2006257228 | 9/2006 |
| JP | 2009242673 | 10/2009 |
| JP | 2009242673 A | 10/2009 |
| WO | 2005070634 A1 | 8/2005 |
| WO | 2005118734 | 12/2005 |
| WO | 2006128722 | 12/2006 |
| WO | 2007003650 | 1/2007 |
| WO | 2009094295 | 7/2009 |
| WO | 2009124709 | 10/2009 |
| WO | 2011141148 | 11/2011 |
| WO | 2012091842 | 7/2012 |
| WO | 2015013084 | 1/2015 |

OTHER PUBLICATIONS

Int'l Search Report and Written Opinion in Int'l Application No. PCT/US2016/049604, issued November 9, 2016.
CoatForce CF10 Product Data Sheet, Lapinus Fibers, Jul. 2008.
CoatForce CF50 Product Data Sheet, Lapinus Fibers, Jul. 2008.
Chao Wu et al., Epoxy Enhanced by Recycled Milled Carbon Fibres in Adhesively-Bonded CFRP for Structural Strengthening, Polymers 2014, 6, 76-92.
Sugiura et al., JP 2006-25228A machine translation in English, Sep. 28, 2006 (Year: 2006).
JP1998017770, English Abstract, Jan. 20, 1998.
JP1993163475, English Abstract, Jun. 29, 1993.
JP2009242673, English Abstract, Oct. 22, 2009.

* cited by examiner

HIGH MODULUS, TOUGHENED ONE-COMPONENT EPOXY STRUCTURAL ADHESIVES WITH HIGH ASPECT RATIO FILLERS

This application claims priority to U.S. patent application Ser. No. 17/035,996, filed on Sep. 29, 2020, which claimed priority to U.S. patent application Ser. No. 15/755,080, filed on Feb. 25, 2018 and now abandoned, which claimed priority to International Application No. PCT/US16/049604, filed on Aug. 31, 2016, which claimed priority to U.S. Patent Application Ser. No. 62/216,401, filed on Sep. 10, 2015. All parent applications are incorporated herein by reference in their entireties.

This invention relates to one-component epoxy structural adhesives that contain a toughener.

Toughened one-component epoxy structural adhesives are used extensively in the automotive and other industries for metal-metal bonding as well as bonding metals to other materials. Often, these structural adhesives must strongly resist failure during vehicle collision situations. Structural adhesives of this type are sometimes referred to as "crash durable adhesives", or "CDAs". This attribute is achieved through the presence of certain types of materials in the adhesive formulation. These materials are often referred to as "tougheners". The tougheners have blocked functional groups that, under the conditions of the curing reaction, can become de-blocked and react with an epoxy resin. Tougheners of this type are described, for example, in U.S. Pat. Nos. 5,202,390, 5,278,257, WO 2005/118734, WO 2007/003650, WO2012/091842, U.S. Published Patent Application No. 2005/0070634, U.S. Published Patent Application No. 2005/0209401, U.S. Published Patent Application 2006/0276601, EP-A-0 308 664, EP 1 498 441A, EP-A 1 728 825, EP-A 1 896 517, EP-A 1 916 269, EP-A 1 916 270, EP-A 1 916 272 and EP-A-1 916 285.

These tougheners are highly effective in imparting toughness, as indicated by the ISO 11343 dynamic impact peel strength test. However, the presence of the tougheners greatly reduces the elastic modulus of the cured adhesive. The elastic modulus refers to the slope of the stress-strain curve of the cured adhesive when subjected to tensile testing using methods such as DIN EN ISO 527-1. Because of the low elastic modulus of the cured adhesive, the bonded assembly of substrates and adhesive is more flexible (i.e., less stiff) than is wanted.

It is common to incorporate a particulate filler into structural adhesives of this type, for rheological reasons and to decrease cost per unit weight. However, this has been found to impart only a modest increase in elastic modulus, and can result in a significant loss of dynamic impact peel strength.

What is desired is a one-component, structural adhesive that when cured exhibits high dynamic impact peel strength and a high elastic modulus. Preferably, these benefits are obtained without significant increase in the viscosity of the uncured adhesive.

This invention is a one-component epoxy structural adhesive comprising in admixture:

A) at least one epoxy resin;

B) a reactive toughener containing urethane and/or urea groups and capped isocyanate groups;

C) one or more epoxy curing agents;

D) 1 to 40 weight percent, based on the total weight of the epoxy structural adhesive, of a mineral filler in the form of fibers having a diameter of 3 μm to 25 μm and an aspect ratio of at least 6, and E) one or more epoxy curing catalysts.

wherein the curing agent(s) and epoxy curing catalyst(s) are selected together such that the structural adhesive exhibits a curing temperature of at least 60° C.

The presence of the fibrous filler having the specified dimensions has surprisingly been found to impart a substantial increase in the elastic modulus of the cured adhesive. Surprisingly, this benefit is achieved without significant loss of dynamic impact peel strength or deterioration of other important properties.

The invention is also a method comprising forming a layer of the structural adhesive of the invention at a bondline between two substrates, and curing the layer to form an adhesive bond between the two substrates. At least one and preferably both of the substrates may be metals.

Suitable epoxy resins include those described at column 2 line 66 to column 4 line 24 of U.S. Pat. No. 4,734,332, incorporated herein by reference. The epoxy resin should have an average of at least 1.8, more preferably at least 1.9 epoxide groups per molecule. Preferably, at least a portion of the epoxy resin(s) is not rubber-modified, meaning that, prior to curing, the epoxy resin is not chemically bonded to a rubber.

Suitable epoxy resins include diglycidyl ethers of polyhydric phenol compounds such as resorcinol, catechol, hydroquinone, biphenol, bisphenol A, bisphenol AP (1,1-bis(4-hydroxylphenyl)-1-phenyl ethane), bisphenol F, bisphenol K and tetramethylbiphenol; diglycidyl ethers of aliphatic glycols and polyether glycols such as the diglycidyl ethers of $C_{2-24}$ alkylene glycols and poly(ethylene oxide) or poly(propylene oxide) glycols; polyglycidyl ethers of phenol-formaldehyde novolac resins (epoxy novolac resins), alkyl substituted phenol-formaldehyde resins, phenol-hydroxybenzaldehyde resins, cresol-hydroxybenzaldehyde resins, dicyclopentadiene-phenol resins and dicyclopentadiene-substituted phenol resins; cycloaliphatic epoxy resins, and any combination of any two or more thereof.

Suitable epoxy resins include diglycidyl ethers of bisphenol A resins such as are sold by Olin Corporation under the designations D.E.R.® 330, D.E.R.® 331. D.E.R.® 332, D.E.R.® 383, D.E.R. 661 and D.E.R.® 662 resins.

Commercially available diglycidyl ethers of polyglycols that are useful include those sold as D.E.R.® 732 and D.E.R.® 736 by Olin Corporation.

Suitable epoxy novolac resins that are commercially available include those sold as D.E.N.® 354. D.E.N.® 431. D.E.N.® 438 and D.E.N.® 439 from Olin Corporation.

Suitable cycloaliphatic epoxy resins include those described in U.S. Pat. No. 3,686,359, incorporated herein by reference. Cycloaliphatic epoxy resins of particular interest are (3,4-epoxycyclohexyl-methyl)-3,4-epoxy-cyclohexane carboxylate, bis-(3,4-epoxycyclohexyl) adipate, vinylcyclohexene monoxide and mixtures thereof.

Other suitable epoxy resins include oxazolidone-containing compounds as described in U.S. Pat. No. 5,112,932. In addition, an advanced epoxy-isocyanate copolymer such as those sold commercially as D.E.R. 592 and D.E.R. 6508 (Olin Corporation) can be used.

The epoxy resin preferably is one or more diglycidyl ethers of a bisphenol or a mixture thereof with up to 10 percent by weight of another epoxy resin that is not a diglycidyl ether of a bisphenol. The most preferred epoxy resins are bisphenol-A based epoxy resins and bisphenol-F based epoxy resins. The bisphenol diglycidyl ether(s) can have average epoxy equivalent weights of 170 to 600 or more, preferably 170 to 400.

An especially preferred epoxy resin is a mixture of at least one diglycidyl ether of a polyhydric phenol, preferably bisphenol-A or bisphenol-F, having an epoxy equivalent weight of 170 to 299, especially 170 to 225, and at least one second diglycidyl ether of a polyhydric phenol, again preferably bisphenol-A or bisphenol-F, this one having an epoxy equivalent weight of at least 300, preferably 310 to 600. The proportions of the resins are preferably such that the mixture has a number average epoxy equivalent weight of 190 to 400. The mixture optionally may also contain up to 20%, preferably up to 10%, of one or more other epoxy resins.

The epoxy resin preferably will constitute at least about 25 weight percent of the structural adhesive, more preferably at least about 30 weight percent, and still more preferably at least about 40 weight percent. The epoxy resin may constitute up to about 70 weight percent of the structural adhesive, more preferably up to about 60 weight percent. If any of the epoxy resins are rubber-modified, the weight of the rubber component is not counted as part of the weight of the epoxy resin.

In some embodiments, the structural adhesive composition contains 30 to 60, preferably 40 to 60, weight percent of a diglycidyl ether of bisphenol A that has an epoxy equivalent weight of up to 225, and 0 to 20%, preferably 2 to 15 weight percent, of a diglycidyl ether of bisphenol A that has an epoxy equivalent weight of 400 or greater, preferably 400 to 1500. Such a structural adhesive composition optionally contains 0.5 to 10 weight percent of a different epoxy resin such as an epoxy novolac resin or an epoxy cresol novolac resin.

The toughener contains urethane and/or urea groups and has terminal capped isocyanate groups. Such tougheners are well-known and can be made, for example, according to any of the methods described in U.S. Pat. Nos. 5,202,390, 5,278,257, WO 2005/118734, WO 2007/003650, WO2012/091842, U.S. Published Patent Application No. 2005/0070634, U.S. Published Patent Application No. 2005/0209401, U.S. Published Patent Application 2006/0276601, EP-A-0 308 664, EP 1 498 441A, EP-A 1 728 825, EP-A 1 896 517, EP-A 1 916 269, EP-A 1 916 270, EP-A 1 916 272 and EP-A-1 916 285.

A particular process for forming the toughener includes the steps of forming an isocyanate-terminated prepolymer, optionally chain-extending the prepolymer and then capping the isocyanate groups of the prepolymer or chain-extended prepolymer.

The prepolymer is formed by reacting an excess of a polyisocyanate with a 300 to 3000 equivalent weight polyol to form an isocyanate-terminated prepolymer. The 300 to 3000 equivalent weight polyol may be, for example, a polyether polyol, a hydroxyl-terminated butadiene homopolymer or copolymer, a hydroxyl-terminated polysiloxane, or other hydroxyl-terminated material that preferably has a glass transition temperature of 0° C. or lower, preferably −20° C. or lower. If a polyether polyol, it may be a polymer of one or more of tetrahydrofuran (tetramethylene oxide), 1,2-butylene oxide, 2,3-butylene oxide, 1,2-propylene oxide and ethylene oxide, with polymers or copolymers of at least 50% of tetrahydrofuran, 1,2-butylene oxide, 2,3-butylene oxide and 1,2-propylene oxide being preferred. The polyol preferably has 2 to 3, more preferably 2, hydroxyl groups per molecule.

A branching agent may be present during the formation of the prepolymer. The branching agent, for purposes of this invention, is a polyol or polyamine compounds having a molecular weight of up to 599, preferably 50 to 500, and at least three hydroxyl, primary amino and/or secondary amino groups per molecule. If used at all, branching agents generally constitute no more than 10%, preferably no more than 5% and still more preferably no more than 2% of the combined weight of the branching agent and 300 to 3000 equivalent weight polyol. Examples of branching agents include polyols such as trimethylolpropane, glycerin, trimethylolethane, ethylene glycol, diethylene glycol, propylene glycol, dipropylene glycol, sucrose, sorbitol, pentaerythritol, triethanolamine, diethanolamine and the like, as well as alkoxylates thereof having a molecular weight of up to 599, especially up to 500.

The polyisocyanate reacted with the 300 to 3000 equivalent weight polyol (and optional branching agent) may be an aromatic polyisocyanate, but it is preferably an aliphatic polyisocyanate such as isophorone diisocyanate, 1,6-hexamethylene diisocyanate, hydrogenated toluene diisocyanate, hydrogenated methylene diphenylisocyanate ($H_{12}$MDI), and the like.

An excess of the polyisocyanate compound is used, so that essentially all of the isocyanate reactive groups of the 300 to 3000 equivalent weight polyol and branching agent (if any) are consumed and the resulting prepolymer is terminated with isocyanate groups. It is generally preferred to combine at least 1.5 equivalents of the polyisocyanate per equivalent of the isocyanate-reactive materials (i.e., the 300 to 3000 molecular weight polyol and the branching agent, if any), as such a ratio minimizes the formation of materials that are advanced in molecular weight. More preferably, from 1.5 to 2.5 equivalents of the polyisocyanate are provided per equivalent of the isocyanate-reactive materials.

The prepolymer-forming reaction is performed by mixing the starting materials and heating them, preferably in the presence of a catalyst for the reaction of isocyanate groups with hydroxyl groups. The reaction mixture is conveniently heated to 60 to 120° C., and the reaction is conveniently continued until a constant isocyanate content is obtained, indicating that all of the isocyanate-reactive groups in the starting materials have been consumed.

The resulting prepolymer preferably has an isocyanate content of 0.5 to 7% by weight, more preferably 1 to 6% by weight and even more preferably 1.5 to 5% by weight. In terms of number average isocyanate equivalent weight, a preferred range is 700 to 8400, a more preferred range is 840 to 4200, and an even more preferred range is 1050 to 2800. The prepolymer suitably contains, on average, at least 1.5, preferably at least two 2.0, to about 4, preferably to about 3, and more preferably to about 2.5 isocyanate groups per molecule.

Before capping, the prepolymer may be reacted with a chain extender to produce a chain extended, isocyanate-terminated prepolymer. Chain extenders include polyol or polyamine compounds having a molecular weight of up to 749 preferably 50 to 500, and two hydroxyl, primary amino and/or secondary amino groups per molecule. Examples of suitable chain extenders include aliphatic diols such as ethylene glycol, diethylene glycol, triethylene glycol, propylene glycol, dipropylene glycol, tripropylene glycol, 1,4-butanediol, 1,6-hexane diol, cyclohexanedimethanol and the like; aliphatic or aromatic diamines such as ethylene diamine, piperazine, aminoethylpiperazine, phenylene diamine, diethyltoluenediamine and the like, and compounds having two phenolic hydroxyl groups such resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, and the like. Among these, the compounds having two phenolic hydroxyl groups are preferred.

The chain extension reaction, if done, is performed in the same general manner as the prepolymer-forming reaction. Enough of the prepolymer is mixed with the chain extender to provide at least two equivalents of isocyanate groups per equivalent of isocyanate-reactive groups contributed by the chain extender. From 2 to up to 4 or more, preferably up to 3 and more preferably up to 2.5 equivalents of isocyanate groups may be provided per equivalent of isocyanate-reactive groups contributed by the chain extender during the chain extension reaction.

The isocyanate groups of the chain-extended prepolymer (or chain-extended prepolymer) are then capped by reaction with a capping group. Various types of capping groups are suitable including those described in U.S. Pat. Nos. 5,202, 390, 5,278,257, 7,615,595, US Published Patent Application Nos. 2005-0070634, 2005-0209401, 2006-0276601 and 2010-0019539, WO 2006/128722, WO 2005/118734 and WO 2005/0070634, all incorporated herein by references. Among the useful capping agents are:

a) Aliphatic, aromatic, cycloaliphatic, araliphatic and/or heteroaromatic monoamines that have one primary or secondary amino group. Examples of such capping compounds include monoalkyl amines such as methyl amine, ethyl amine, isopropyl amine, sec-butylamine, t-butyl amine; dialkyl amines such as dimethylamine, diethylamine, diisopropylamine, di-sec-butylamine, dihexylamine and dioctyl amine; cyclohexylamine or dicyclohexylamine wherein the cyclohexyl groups are optionally substituted with one or more alkyl groups; benzylamine and diphenylamine wherein the phenyl groups are optionally substituted with one or more alkyl groups; morpholine; N-alkylpiperadines and imidazols having an amine hydrogen atom.

b) phenolic compounds, including monophenols, polyphenols and aminophenols. Examples of such phenolic capping compounds include phenol, alkyl phenols that contain one or more alkyl groups that each may contain from 1 to 30 carbon atoms, naphthol or a halogenated phenol. Suitable polyphenols contain two or more, preferably two, phenolic hydroxyl groups per molecule and include resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, as well as halogenated derivatives thereof. Suitable aminophenols are compounds that contain at least one primary or secondary amino group and at least one phenolic hydroxyl group. The amino group is preferably bound to a carbon atom of an aromatic ring. Examples of suitable aminophenols include 2-aminophenol, 4-aminophenol, various aminonaphthols, and the like.

c) Benzyl alcohol, which may be substituted with one or more alkyl groups on the aromatic ring;

d) Hydroxy-functional acrylate or methacrylate compounds such as 2-hydroxyethylacrylate, 2-hydroxypropylacrylate, 4-hydroxybutylacrylate, 2-hydroxybutylacrylate, 2-aminopropylacrylate, 2-hydroxyethylmethacrylate, 2-hydroxypropylmethacrylate, 4-hydroxybutylmethacrylate and 2-hydroxybutylmethacrylate;

e) thiol compounds such as alkylthiols having 2 to 30, preferably 6 to 16, carbon atoms in the alkyl group, including dodecanethiol;

f) alkyl amide compounds having at least one amine hydrogen such as acetamide and N-alkylacetamide; and g) a ketoxime.

The phenol, polyphenol and aminophenol capping agents are generally preferable. In some embodiments, at least 90%, preferably at least 95%, more preferably at least 98%, up to 100% of the isocyanate groups of the prepolymer are capped with capping agents of one or more of these types. In such embodiments any remaining uncapped isocyanate groups may be capped with another type of capping agent.

The capping reaction can be performed under the general conditions described already with respect to the prepolymer-forming and chain-extension reactions, i.e., by combining the materials in the stated ratios and heating to 60 to 120° C. optionally in the presence of a catalyst for the reaction of isocyanate groups with the isocyanate-reactive groups of the capping agent. The reaction is continued until the isocyanate content is reduced to a constant value, which is preferably less than 0.1% by weight. Preferably, fewer than 5%, preferably fewer than 1% of the isocyanate groups may remain uncapped.

The resulting toughener suitably has a number average molecular weight from at least 3000, preferably at least 4,000, to about 35,000, preferably to about 20,000 and more preferably to about 15,000, measured by GPC, taking into account only those peaks that represent molecular weights of 1000 or more.

The polydispersity (ratio of weight average molecular weight to number average molecular weight) of the toughener is suitably from about 1 to about 4, preferably from about 1.5 to 2.5. The toughener suitably contains, on average, from about 1.5, preferably from about 2.0, to about 6, preferably to about 4, more preferably to about 3 and still more preferably to about 2.5, capped isocyanate groups per molecule. An especially preferred prepolymer contains an average of from 1.9 to 2.2 capped isocyanate groups per molecule.

The toughener by itself may have a glass transition temperature of no greater than 0° C., preferably no greater than −20° C. and more preferably no greater than −35° C. as measured by differential scanning calorimetry.

The toughener constitutes at least 5 weight percent, preferably at least 8 weight percent or at least 10 weight percent, of the structural adhesive composition. The toughener may constitute up to 45 weight percent thereof, preferably up to 30 weight percent and more preferably up to 25 weight percent. The amount of toughener that is needed to provide good properties, particularly good low temperature properties, in any particular structural adhesive composition may depend somewhat on the other components of the composition, and may depend somewhat on the molecular weight of the toughener.

The structural adhesive also contains a curing agent. The curing agent is selected together with any catalysts such that the adhesive exhibits a curing temperature of at least 60° C.

Typically the structural adhesive will exhibit a characteristic curing temperature at or above which it reacts and cures rapidly, due to the thermal activation of the curing agent, the catalyst, or both. The curing temperature preferably is at least 80° C., and may be at least 100° C. or at least 140° C. It may be as high as, for example, 180° C. The "curing temperature" refers to the lowest temperature at which the structural adhesive achieves at least 30% of its lap shear strength (DIN ISO 1465) at full cure within 2 hours. The lap shear strength at "full cure" is measured on a sample that has been cured for 30 minutes at 180° C. which conditions represent "full cure" conditions.

The curing agent is a compound that reacts with at least two epoxy groups to form a linkage between them. Suitable curing agents include materials such as boron trichloride/amine and boron trifluoride/amine complexes, dicyandiamide, melamine, diallylmelamine, guanamines such as dicyandiamide, methyl guanidine, dimethyl guanidine, trimethyl guanidine, tetramethyl guanidine, methylisobiguanidine, dimethylisobiguanidine, tetramethylisbiguandidine, heptamethylisobiguanidine, hexamethylisobiguanidine, acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and/or 4,4'-diaminodiphenylsulphone is particularly preferred.

The curing agent is used in an amount sufficient to cure the composition. Typically, enough of the curing agent is provided to consume at least 80% of the epoxide groups present in the composition. A large excess over that amount needed to consume all of the epoxide groups is generally not needed. Preferably, the curing agent constitutes at least about 1.5 weight percent of the structural adhesive, more preferably at least about 2.5 weight percent and even more preferably at least 3.0 weight percent. The curing agent preferably constitutes up to about 15 weight percent of the structural adhesive composition, more preferably up to about 10 weight percent, and most preferably up to about 8 weight percent.

The structural adhesive contains a catalyst to promote the cure of the adhesive, i.e., the reaction of epoxy groups with epoxide-reactive groups on the curing agent and other components of the adhesive. As mentioned above, the catalyst is selected together with the curing agent to provide the heat-activated cure. The catalyst is preferably encapsulated or otherwise a latent type which becomes active only upon exposure to elevated temperatures. Among preferred epoxy catalysts are ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethy)phenol, piperidine or derivatives thereof, various aliphatic urea compounds such as are described in EP 1 916 272; $C_1$-$C_{12}$ alkylene imidazole or N-arylimidazoles, such as 2-ethyl-2-methylimidazol, or N-butylimidazol and 6-caprolactam. A preferred catalyst is 2,4,6-tris(dimethylaminomethyl)phenol integrated into a poly(p-vinylphenol) matrix (as described in European patent EP 0 197 892), or 2,4,6-tris(dimethylaminomethyl)phenol integrated into a novolac resin, including those described in U.S. Pat. No. 4,701,378.

The catalyst may be present in an amount of at least about 0.1 weight percent of the structural adhesive, more preferably at least about 0.5 weight percent. Preferably, the catalyst constitutes up to about 4 weight percent of the structural adhesive, more preferably up to about 1.5 weight percent, and most preferably up to about 0.9 weight percent.

The structural adhesive contains at least one mineral filler in the form of fibers having a diameter of 1 to 50 μm (D50, as measured by microscopy) and an aspect ratio of at least 6. The diameter of the fibers may be 3 to 25 μm or 5 to 20 μm, and the aspect ratio may be at least 8 or at least 9, at least 12, at least 15 or at least 20. The aspect ratio of the fibers may be, for example, up to 100, up to 50, up to 40, up to 30 or up to 20.

The diameter of the fiber is taken as that of a circle having the same cross-sectional area as the fiber. The aspect ratio is the fiber length divided by the diameter.

The fibers may have a distribution of aspect ratios in the range of 6 or greater, such as from 6 to 50. When such a distribution of fibers is present, in some embodiments at least 10% by weight, at least 25% by weight or at least 50% by weight have an aspect ratio of at least 20, preferably 20 to 50 or 20 to 40, with the remainder of the fibers having an aspect ratio of at least 6 but less than 20.

The fibers may be, for example, calcium carbonate, calcium oxide, tale, carbon black, glass, an aluminosilicate, a calcium silicate, mica, hydrated aluminum oxide, or a naturally occurring clay such as bentonite, wollastonite or kaolin.

The fibrous mineral filler may constitute 1 to 40% of the total weight of the structural adhesive composition. In some embodiments, it constitutes at least 5% or at least 7.5% of the weight of the structural adhesive composition, and may constitute up to 30%, up to 25%, up to 20% or up to 15% of the weight thereof. In addition to having a beneficial effect on the elastic modulus of the cured adhesive, this filler also may perform one or more other functions, such as (1) modifying the rheology of the structural adhesive in a desirable way, (2) reducing overall cost per unit weight, (3) absorbing moisture or oils from the structural adhesive or from a substrate to which it is applied, and/or (4) promoting cohesive, rather than adhesive, failure. The presence of the fibers in the cured adhesives also has been found to lead to an increase in dynamic impact peel strength (as measured by the wedge impact method of ISO 11343), compared to the case of an otherwise like adhesive which instead contains a low aspect ratio filler (L/D<6) at the same weight content. This last benefit is more pronounced when at least of the portion of the fibers has an aspect ratio of at least 20.

The structural adhesive of the invention may contain various other, optional ingredients, in addition to those described above.

At least one low (less than 6, preferably less 3, more preferably less than 2 length/diameter ratio) aspect ratio filler may be present in the structural adhesive, in addition to the fibrous mineral described above. This low molecular weight filler may be made of any of the materials described above with regard to the fibrous mineral filler, as well as various types of polymeric fibers, expandable microballoons and non-expandable microballoons. The low aspect ratio filler(s) may constitute 0.1 to 30 weight percent of the structural adhesive composition. Preferably, the low aspect ratio fillers constitute 15% or less of the weight of the structural adhesive composition. More preferably, the low aspect ratio filler(s) and fibrous mineral filler together constitute 10 to 40, more preferably 10 to 35 and still more preferably 10 to 30 percent of the weight of the structural adhesive composition.

In addition to the fibrous mineral filler and the low aspect ratio filler, the structural adhesive composition may contain up to 10% by weight, preferably 1 to 6% by weight, of one or more desiccants such as fumed silica, hydrophobically modified fumed silica, silica gel, aerogel, various zeolites and molecular sieves, and the like.

The structural adhesive composition may include a rubber component, separate from the toughener described above. The rubber component does not include capped isocyanate groups. The rubber component may be, for example, a liquid rubber, preferably having two or more epoxide-reactive groups such as amino or preferably carboxyl groups. It is preferred that at least a portion of the liquid rubber has a glass transition temperature ($T_g$) of –40° C. or lower, especially –50° C. or lower, as measured by differential scanning calorimetry. Such a liquid rubber component may be entirely or partially reacted with a portion of the epoxy resin component.

Such a liquid rubber may be a homopolymer or copolymer of a conjugated diene, especially a diene/nitrile copolymer. The conjugated diene rubber is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized nitrile monomer. The liquid rubber preferably contains from about 1.5, more preferably from about 1.8, to about 2.5, more preferably to about 2.2, of epoxide-reactive terminal groups per molecule, on average. Carboxyl-terminated rubbers are preferred. The molecular weight ($M_n$) of the rubber is suitably from about 2000 to about 6000, more preferably from about 3000 to about 5000. Suitable carboxyl-functional butadiene and butadiene/acrylonitrile rubbers are commercially available from Noveon under the tradenames Hycar® 2000X162 carboxyl-terminated butadiene homopolymer, Hycar® 1300X31, Hycar® 1300X8, Hycar® 1300X13, Hycar® 1300X9 and Hycar® 1300X18 carboxyl-terminated butadiene/acrylonitrile copolymers. A suitable amine-terminated butadiene/acrylonitrile copolymer is sold under the tradename Hycar® 1300X21.

Other suitable rubber materials include amine-terminated polyethers, fatty acids (which may be dimerized or oligomerized), and elastomeric polyester.

Another type of rubber that may be present in the structural adhesive composition is a core-shell rubber. The core-shell rubber is a particulate material having a rubbery core. The rubbery core preferably has a $T_g$ of less than –20° C., more preferably less than –50° C. and even more preferably less than –70° C. by differential scanning calorimetry. The $T_g$ of the rubbery core may be well below –100° C. The core-shell rubber also has at least one shell portion that preferably has a $T_g$ of at least 50° C. by differential scanning calorimetry. The core of the core-shell rubber may be a polymer or copolymer of a conjugated diene such as butadiene, or a lower alkyl acrylate such as n-butyl-, ethyl-, isobutyl- or 2-ethylhexylacrylate, or may be a silicone rubber. The shell polymer, which is optionally chemically grafted or crosslinked to the rubber core, is preferably polymerized from at least one lower alkyl methacrylate such as methyl-, ethyl- or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer is generally between 20,000 and 500,000. Examples of useful core-shell rubbers include those described in EP 1 632 533 A1 and those sold by Kaneka Corporation under the designation Kaneka Kane Ace, including Kaneka Kane Ace MX 156 and Kaneka Kane Ace MX 120 core-shell rubber dispersions.

The total rubber content of the structural adhesive of the invention can range from as little as 0 weight percent to as high as 30 weight percent, based on the total weight of the adhesive. A preferred rubber content is up to 20 weight percent, up to 15 weight percent or up to 5 weight percent. No portion of the toughener is considered in calculating total rubber content.

A monomeric or oligomeric, addition polymerizable, ethylenically unsaturated material is optionally present in the structural adhesive composition. This material should have a molecular weight of less than about 1500. This material may be, for example, an acrylate or methacrylate compound, an unsaturated polyester, a vinyl ester resin, or an epoxy adduct of an unsaturated polyester resin. A free radical initiator can be included in the structural adhesive composition as well, in order to provide a source of free radicals to polymerize this material. The inclusion of an ethylenically unsaturated material of this type provides the possibility of effecting a partial cure of the structural adhesive through selective polymerization of the ethylenic unsaturation.

The structural adhesive composition can further contain other additives such as dimerized fatty acids, diluents, plasticizers, extenders, pigments and dyes, fire-retarding agents, thixotropic agents, expanding agents, flow control agents, adhesion promoters and antioxidants. Suitable expanding agents include both physical and chemical type agents. The structural adhesive may also contain a thermoplastic powder such as polyvinylbutyral or a polyester polyol, as described in WO 2005/118734.

The foregoing structural adhesive composition is formed into a layer at a bondline between two substrates to form an assembly, and the structural adhesive layer is cured at the bondline to form an adhesive bond between the two substrates.

The structural adhesive composition can be applied to the substrates by any convenient technique. It can be applied cold or be applied warm if desired. It can be applied manually and/or robotically, using for example, a caulking gun, other extrusion apparatus, or jet spraying methods. Once the structural adhesive composition is applied, the substrates are contacted such that the adhesive is located at a bondline between the substrates.

After application, the structural adhesive is cured by heating it to at or above its curing temperature. Generally, this temperature is at least 60° C., and is preferably 80° C. or above, more preferably about 140° C. or above. Preferably, the temperature is about 220° C. or less, and more preferably about 180° C. or less.

The structural adhesive of the invention can be used to bond a variety of substrates together including wood, metal, coated metal, aluminum, a variety of plastic and filled plastic substrates, fiberglass and the like. In one preferred embodiment, the structural adhesive is used to bond parts of automobiles or other vehicles. Such parts can be steel, coated steel, galvanized steel, aluminum, coated aluminum, plastic and filled plastic substrates.

An application of particular interest is in bonding vehicle frame components to each other or to other components. The frame components are often metals such as cold rolled steel, galvanized metals, or aluminum. The components to be bonded to the frame components can also be metals as just described, or can be other metals, plastics, composite materials, and the like.

Assembled automotive frame members are usually coated with a coating material that requires a bake cure. The coating is typically baked at temperatures that may range from 140° C. to over 200° C. In such cases, it is often convenient to apply the structural structural adhesive to the frame components, then apply the coating, and cure the structural adhesive at the same time the coating is baked and cured.

The cured adhesive in some embodiments exhibits an elastic modulus of at least 2200 MPa, preferably at least 2500 MPa and more preferably at least 3000 MPa, when cured for 30 minutes at 180° C. and tested in accordance with DIN EN ISO 527-1. The elastic modulus may be as much as 5000 MPa or more. The cured structural adhesive in some embodiments also exhibits a dynamic impact peel strength of at least 20 N/mm, preferably at least 25 N/mm, to as much as 50 N/mm or more, when applied between oily 1.0 mm thick HC420LAD+Z100 steel coupons, cured at 180° C. for 30 minutes and then tested at 23° C. in accordance with the ISO 11343 wedge impact method at 23° C., as described in the following examples.

The following examples are provided to illustrate the invention but are not intended to limit the scope thereof. All parts and percentages are by weight unless otherwise indicated.

In the following examples:

Epoxy Resin A is a liquid diglycidyl ether of bisphenol A having an epoxy equivalent weight of about 187.

Epoxy Resin B is a mixture of solid and liquid diglycidyl ethers of bisphenol A. The mixture has an epoxy equivalent weight of about 240.

Epoxy Resin C is an epoxy novolac resin having an epoxy equivalent weight of about 179.

Epoxy Resin D is an epoxy-functional diluent.

Toughener A contains blocked isocyanate groups. It is prepared by mixing 54.79 parts of a 2000 molecular weight polytetrahydrofuran and 13.65 parts of a 2800 molecular weight, hydroxyl-terminated polybutadiene rubber at 120° C., cooling the mixture to 60° C., adding 15.09 parts of isophorone diisocyanate and a tin urethane catalyst and heating the resulting reaction mixture to 85° C. for 45 minutes under nitrogen. Then, 5.74 parts of o,o-diallylbisphenol A are added, and the mixture is stirred for 120 minutes under vacuum in a 100° C. bath. 10.65 parts of cardanol are added and the mixture is stirred for 240 minutes under vacuum in a 105° C. bath.

Toughener B contains blocked isocyanate groups. It is prepared by mixing 57.58 parts of a 2000 molecular weight polytetrahydrofuran and 14.39 parts of a 2800 molecular weight hydroxyl-terminated polybutadiene rubber at 120° C. cooling the mixture to 60° C., adding 11.54 parts of hexamethylene diisocyanate and a tin urethane catalyst and heating the resulting reaction mixture to 85° C. for 45 minutes under nitrogen. Then, 5.74 parts of o,o'-diallylbisphenol A are added, and the mixture is stirred for 120 minutes under vacuum in a 100° C. bath. 10.58 parts of cardanol are added and the mixture is stirred for 240 minutes under vacuum in a 105° C. bath.

GLYEO is a commercial grade of 3-glycidyloxypropyltriethoxysilane.

EP796 is tris (2,4,6-dimethylaminomethyl)phenol in a poly(vinylphenol) matrix.

The Calcium Carbonate is a low aspect ratio product available commercially as Omya BSH, from Omya GmbH.

The Calcium Oxide is a low aspect ratio product from Lhoist Group.

Microspheres A are hollow glass spheres, 90% of which having a particle size of 10 to 105 μm and a density of 0.25 g/cc commercially available from 3M.

Microspheres B are hollow glass spheres having a particle size of 10 to 40 μm and a density of 0.46 g/cc, commercially available from 3M.

Wollastonite A has an aspect ratio of about 13 and a fiber diameter of about 12 μm. It is sold as Nyglos 8 by NYCO Minerals.

Wollastonite B has an aspect ratio of about 9 and a fiber diameter of about 7 μm. It is sold as Nyglos 4W by NYCO Minerals.

Wollastonite C is a powder grade wollastonite having an aspect ratio of 5 and a median particle diameter of 20 μm. It is sold as Nyad 200 by NYCO Minerals.

Wollastonite D is a powder grade wollastonite having an aspect ratio of 3 and a median particle diameter of 3 μm. It is sold as Nyad 5000 by NYCO Minerals.

Glass Fiber A has an aspect ratio of 11 and a fiber diameter of about 11 μm. It is sold as Lanxess MF7982 (19/346) by Lanxess.

Glass Fiber B has an aspect ratio of 15 and a fiber diameter of about 14 μm. It is sold as Lanxess MF7982 by Lanxess.

Glass Fiber C has an aspect ratio of 29 and a fiber diameter of about 16 μm. It is sold as Fibertec MF 6608 by Fibertec Inc.

Glass Fiber D has an aspect ratio of 18 and a fiber diameter of about 16 μm. It is sold as Fibertec MF 6616 by Fibertec Inc.

Carbon Fiber A has an aspect ratio of 11 and a fiber diameter of about 7 μm. It is sold as Sigrafill C C30 M 080 by SGL Carbon.

Carbon Fiber B has an aspect ratio of 21 and a fiber diameter of about 7 μm. It is sold as Sigrafill C C30 M 151 by SGL Carbon.

EXAMPLE 1 AND COMPARATIVE SAMPLES A-D

Structural Adhesive Example 1 and Comparative Samples A-D are prepared by blending ingredients as indicated in Table 1:

TABLE 1

| | Parts By Weight | | | | |
| Component | Comp. Samp. A | Comp. Samp. B | Comp. Samp. C | Comp. Samp. D | Ex. 1 |
| --- | --- | --- | --- | --- | --- |
| Epoxy Resin A | 67.46 | 60.64 | 60.64 | 60.64 | 60.64 |
| Toughener A | 19.0 | 19.0 | 19.0 | 19.0 | 19.0 |
| GLYEO | 0.6 | 0.6 | 0.6 | 0.6 | 0.6 |
| Colorant | 0.4 | 0.4 | 0.4 | 0.4 | 0.4 |
| Dicyanamide | 6.74 | 6.06 | 6.06 | 6.06 | 6.06 |
| EP796 | 0.8 | 0.8 | 0.8 | 0.8 | 0.8 |
| Hydrophobic Fumed Silica | 5.0 | 5.0 | 5.0 | 5.0 | 5.0 |
| Calcium Oxide | 0 | 7.5 | 0 | 0 | 0 |
| Wollastonite A | 0 | 0 | 0 | 0 | 7.5 |
| Wollastonite C | 0 | 0 | 7.5 | 0 | 0 |
| Wollastonite D | 0 | 0 | 0 | 7.5 | 0 |

Test samples for tensile strength, elongation and elastic modulus measurements are made by curing a portion of each sample for 30 minutes at 180° C. Test specimens are cut from the cured samples and evaluated according to DIN EN ISO 527-1.

Impact peel testing is performed for each adhesive sample. The substrates are 1.0 mm-thick HC420LAD+Z100 steel coupons. The test coupons for the impact peel testing are 90 mm×20 mm with a bonded area of 30×20 mm. They are cleaned with heptane and then re-greased by dipcoating them into a 9:1 by volume solution of heptane and a corrosion prevention lubricant (Anticorit PL 3802-39S). The adhesive sample is then applied to the bond area of one coupon and squeezed onto the other coupon to prepare each test specimen, with spacers present to maintain an adhesive layer thickness of 0.2 mm. The assembled test specimens are cured at 180° C. for 30 minutes. The impact peel testing is performed in accordance with ISO 11343 wedge impact method. Testing is performed at an operating speed of 2 m/sec with samples at a temperature of 23° C.

Lap shear specimens are made using coupons of the same steel, except they are 1.2 mm thick. The specimens are made by sprinkling glass beads (0.2 mm diameter) onto one of the coupons, applying the adhesive sample, and then positioning the second coupon over top the adhesive. The bonded area in each case is 25×10 mm, and the adhesive layer thickness is controlled by the glass beads to 0.2 mm. The test specimens are cured for 30 minutes at 180° C. and evaluated for lap shear strength in accordance with DIN ISO 1465. Testing is performed at 23° C. and a test speed of 10 mm/minute.

Viscosity and yield stress are measured on a Bohlin CS-50 rheometer, C/P 20, up/down $0.1\text{-}20\ \text{s}^{-1}$, with data evaluated according to the Casson model.

Results of this testing are as indicated in Table 2.

TABLE 2

| | Comp. Samp. A | Comp. Samp. B | Comp. Samp. C | Comp. Samp. D | Ex. 1 |
|---|---|---|---|---|---|
| Filler | None | CaO | Woll. C | Woll. D | Woll. A |
| Filler Aspect Ratio | N/A | ~1 | 5 | 3 | 13 |
| Property | | | | | |
| Elastic Modulus, MPa | 2035 | 2067 | 2205 | 2162 | 2733 |
| Tensile Strength, MPa | 47.6 | 44.2 | 46.5 | 46.5 | 43.6 |
| Elongation at Break, % | 9.5 | 7.6 | 7.3 | 8.2 | 6.1 |
| Impact Peel Str., N/mm | 32.0 | 31.9 | 31.1 | 31.0 | 32.2 |
| Lap Shear Str., MPa | 40.6 | 37.8 | 39.5 | 40.3 | 38.5 |
| Lap Shear Elongation, % | 2.2 | 1.9 | 1.9 | 2.1 | 2.0 |

TABLE 2-continued

| | Comp. Samp. A | Comp. Samp. B | Comp. Samp. C | Comp. Samp. D | Ex. 1 |
|---|---|---|---|---|---|
| Yield stress, 45° C., Pa | 63.6 | 78.8 | 86.5 | 85.5 | 56.1 |
| Viscosity, 45° C., Pa · s | 18.0 | 23.9 | 22.9 | 24.2 | 26.8 |

CaCO$_3$-calcium carbonate;
CaO-calcium oxide;
Woll. A-Wollastonite A;
Woll. C-Wollastonite C;
Woll. D-Wollastonite D.

Comparative Sample A is an unfilled control. In each of Comparative Samples B-D and in Example 1, the Comparative Sample A formulation is modified by adding 7.5 parts of a filler and removing an equal quantity of epoxy resin and dicyanamide. The amount of the toughener is kept constant across these samples.

Comparative Sample B shows the effect of adding a low aspect ratio calcium oxide filler. The addition of this filler has very little effect on any of the properties except for increasing yield stress and viscosity mildly.

The addition of low aspect ratio wollastonite as in Comparative Samples C and D results in a small (6-8.5%) increase in elastic modulus. Like the calcium oxide, these fillers increase yield stress and viscosity somewhat, but have little other effect on the properties of the cured adhesive.

Example 1 contains a high aspect ratio wollastonite filler. The elastic modulus is increased by 34% over Comparative Sample A, which is several times the increase seen with the fillers of Comparative Samples B. C and D. Other tensile properties, lap shear strength and, surprisingly, impact peel resistance are not significantly different than those of Comparative Samples A-D. Yield stress and viscosity are slightly higher than the filled comparative samples.

EXAMPLES 2-4 AND COMPARATIVE SAMPLES A, E, F AND G

Structural Adhesive Examples 2-4 and Comparative Samples E, F and G are prepared by blending ingredients as indicated in Table 3:

TABLE 3

| | Parts By Weight | | | | | |
|---|---|---|---|---|---|---|
| Component | Comp. E | Comp. F | Comp. G | Ex. 2 | Ex. 3 | Ex. 4 |
| Epoxy Resin A | 53.4 | 53.82 | 53.82 | 53.82 | 53.82 | 33.17 |
| Epoxy Resin B | 0 | 0 | 0 | 0 | 0 | 16.59 |
| Toughener A | 19.0 | 19.0 | 19.0 | 19.0 | 19.0 | 19.0 |
| GLYEO | 0.6 | 0.6 | 0.6 | 0.6 | 0.6 | 0.6 |
| Colorant | 0.4 | 0.4 | 0.4 | 0.4 | 0.4 | 0.4 |
| Dicyanamide | 4.80 | 5.38 | 5.38 | 5.38 | 5.38 | 4.58 |
| EP796 | 0.8 | 0.8 | 0.8 | 0.8 | 0.8 | 0.8 |
| Hydrophobic Fumed Silica | 5.0 | 5.0 | 5.0 | 5.0 | 5.0 | 5.0 |
| Calcium Carbonate | 7.0 | 0 | 0 | 0 | 0 | 0 |
| Calcium Oxide | 6.5 | 15.0 | 0 | 0 | 0 | 6.0 |
| Microspheres A | 2.5 | 0 | 0 | 0 | 0 | 0 |
| Microspheres B | 0 | 0 | 0 | 0 | 0 | 3.86 |
| Wollastonite A | 0 | 0 | 0 | 15.0 | 0 | 10 |
| Wollastonite B | 0 | 0 | 0 | 0 | 15.0 | 0 |
| Wollastonite D | 0 | 0 | 15.0 | 0 | 0 | 0 |

These adhesives are tested in the same manner as described with respect to Example 1 and Comparative Samples A-D. Results are as indicated in Table 4. The results for Comparative Sample A are repeated for reference.

TABLE 4

|  | Comp. A | Comp. E | Comp. F | Comp. G | Ex. 2 | Ex. 3 | Ex. 4 |
|---|---|---|---|---|---|---|---|
| Filler Type, Amount | None | Mix[1], 16 wt. % | CaO, 15 wt. % | Woll. D, 15 wt. % | Woll. A, 15 wt. % | Woll. B, 15 wt. % | Woll. Mix[2], 19.86 wt. % |
| | | | | Properties | | | |
| Elastic Modulus, MPa | 2035 | 2121 | 2247 | 2483 | 3418 | 3470 | 2899 |
| Tensile Strength, MPa | 47.6 | 37.9 | 41.4 | 43.6 | 44.5 | 51.9 | 44.2 |
| Elongation at Break, % | 9.5 | 3.8 | 5.6 | 6.1 | 2.9 | 4.0 | 3.9 |
| Impact Peel Str., N/mm | 32.0 | 25.8 | 29.7 | 30.4 | 30.9 | 30.4 | 27.0 |
| Lap Shear Str., MPa | 40.6 | 31.8 | 36.1 | 38.0 | 35.7 | 38.0 | 36.4 |
| Lap Shear Elongation, % | 2.2 | 1.5 | 1.8 | 1.9 | 1.7 | 1.9 | 1.8 |
| Yield stress, 45° C., Pa | 63.6 | 107.2 | 106.0 | 102.3 | 66.2 | 124.3 | 89.6 |
| Viscosity, 45° C., Pa · s | 18.0 | 44.8 | 37.5 | 39.3 | 37.8 | 32.3 | 57.8 |

[1]Mixture of calcium carbonate, calcium oxide and hollow glass spheres.

[2]Mixture of Wollastonite A, calcium carbonate and glass microspheres.

Comparative Sample A is again the unfilled baseline structural adhesive. In each of Comparative Samples E, F and G and Examples 2-4, the Comparative Sample A formulation is modified by adding filler and removing an equal quantity of epoxy resin and dicyanamide. The amount of the toughener is kept constant across these Samples. The epoxy resin component also is changed in Example 4.

Comparative Samples E, F and G shows the effect of adding low aspect ratio fillers. Comparative Example (1, which contains 15 weight-% a low aspect ratio wollastonite filler, exhibits an increase in elastic modulus of about 22%, compared to the baseline case. This increase in elastic modulus is far less than seen with Example 1, which contains only 7.5 weight-% of the high aspect ratio wollastonite filler. Comparative Examples E and F show only a small benefit in elastic modulus. All of Comparative Samples E, F and G show some loss in impact peel resistance and lap shear strength.

Examples 2 and 3 each exhibit increases in elastic modulus of about 70%, compared to the baseline case. Other properties are close to or better than Comparative Samples E, F and G. Examples 2 and 3, in comparison with Comparative Samples E, F and G, clearly demonstrate the large and unexpected effect of selecting a high aspect ratio filler. Examples 2 and 3 in comparison with Comparative Sample G shows that this effect is not due to the differences in the type of filler.

Example 4 is formulated somewhat differently than the other adhesives, but nonetheless exhibits a large improvement in elastic modulus compared to any of the Comparative Samples.

EXAMPLE 5 AND COMPARATIVE SAMPLE H

Structural Adhesive Example 5 and Comparative Sample H are prepared by blending ingredients as indicated in Table 5:

TABLE 5

| | Parts By Weight | |
|---|---|---|
| Component | Comp. Sample H | Ex. 5 |
| Epoxy Resin A | 14.0 | |
| Epoxy Resin B | 30.0 | |
| Epoxy Resin C | 3.0 | |
| Epoxy Resin D | 2.0 | |
| Toughener B | 19.5 | |
| GLYEO | 0.55 | |
| Colorant | 0.35 | |
| Dicyanamide | 4.70 | |
| Curing Accelerants | 1.5 | |
| Polyvinyl butyral terpolymer | 0.65 | |
| Hydrophobic Fumed Silica | 5.70 | |
| Calcium Carbonate | 7.6 | 0 |
| Calcium Oxide | 6.5 | 6.5 |
| Microspheres A | 1.75 | 1.75 |
| 0.2 mm glass beads | 2.0 | 2.0 |
| Wollastonite A | 0 | 7.6 |

These adhesives are tested in the same manner as described above, with results as indicated in Table 6. The substrates for the dynamic impact peel strength testing are 0.75 mm grade DX56 D+Z100MB hot dipped zinc coated steel and 0.75 mm DC04 ZE50/50 electrolytically tine coated steel, each from Thyssen Krupp.

TABLE 6

| | Comp. H | Ex. 5 |
|---|---|---|
| Filler Type, Amount | Low aspect ratio mixture.¹ | High aspect ratio wollastonite, low aspect ratio calcium oxide, microbeads² |
| | Properties | |
| Elastic Modulus, MPa | 1837 | 2508 |
| Tensile Strength, MPa | 31.0 | 35.0 |
| Elongation at Break, % | 4.6 | 3.7 |
| Impact Peel Str., N/mm | 31.8 | 30.0 |

TABLE 6-continued

| | Comp. H | Ex. 5 |
|---|---|---|
| Yield stress, 45° C., Pa | 249 | 408 |
| Viscosity, 45° C., Pa · s | 65.0 | 70 |

¹Mixture of calcium carbonate, calcium oxide and hollow glass spheres.
²Mixture of Wollastonite A, calcium carbonate and glass microspheres.

Once again, the inclusion of a high aspect ratio mineral filler leads to a large improvement in elastic modulus while having only a small effect on other properties. In Example 5, the benefits of the high aspect filler are seen even when additional, low aspect ratio fillers are present.

EXAMPLES 6-15

Example 1 is repeated 10 times, in each instance replacing the wollastonite fibers with glass or carbon fibers as indicated in Table 7. Results of testing of the resulting cured adhesives are as indicated in Table 8.

TABLE 7

| | Parts by Weight | | | | | | | | | |
|---|---|---|---|---|---|---|---|---|---|---|
| Component | Ex. 6 | Ex. 7 | Ex. 8 | Ex. 9 | Ex. 10 | Ex. 11 | Ex. 12 | Ex. 13 | Ex. 14 | Ex. 15 |
| Epoxy Resin A | 53.82 | 53.82 | 47.00 | 40.18 | 53.82 | 60.64 | 53.82 | 47.00 | 58.37 | 53.82 |
| Toughener A | 19.00 | 19.00 | 19.00 | 19.00 | 19.00 | 19.00 | 19.00 | 19.00 | 19.00 | 19.00 |
| GLYEO | 0.60 | 0.60 | 0.60 | 0.60 | 0.60 | 0.60 | 0.60 | 0.60 | 0.60 | 0.60 |
| Colorant | 0.40 | 0.40 | 0.40 | 0.40 | 0.40 | 0.40 | 0.40 | 0.40 | 0.40 | 0.40 |
| Dicyanamide | 5.38 | 5.38 | 4.70 | 4.02 | 5.38 | 6.06 | 5.38 | 4.70 | 5.83 | 5.38 |
| EP796 | 0.80 | 0.80 | 0.80 | 0.80 | 0.80 | 0.80 | 0.80 | 0.80 | 0.80 | 0.80 |
| Hydrophobic Fumed Silica | 5.00 | 5.00 | 5.00 | 5.00 | 5.00 | 5.00 | 5.00 | 5.00 | 5.00 | 5.00 |
| Glass Fiber A | 15 | 0 | 0 | 0 | 0 | 0 | 0 | 0 | 0 | 0 |
| Glass Fiber B | 0 | 15 | 22.50 | 30.00 | 0 | 0 | 0 | 0 | 0 | 0 |
| Glass Fiber C | 0 | 0 | 0 | 0 | 15 | 0 | 0 | 0 | 0 | 0 |
| Carbon Fiber A | 0 | 0 | 0 | 0 | 0 | 7.5 | 15 | 22.5 | 0 | 0 |
| Carbon Fiber B | 0 | 0 | 0 | 0 | 0 | 0 | 0 | 0 | 10 | 15 |

TABLE 8

| Designation | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|
| Fiber loading, % | 15 | 15 | 22.5 | 30 | 15 | 7.5 | 15 | 22.5 | 10 | 15 |
| Fiber Aspect Ratio, diameter (μm) | 11 (14) | 15 (14) | 15 (14) | 15 (14) | 29 (16) | 11 (7) | 11 (7) | 11 (7) | 21 (7) | 21 (7) |
| | Properties | | | | | | | | | |
| Elastic Modulus, MPa | 3083 | 3191 | 3217 | 3787 | 2786 | 3900 | 4775 | 5663 | 3779 | 4056 |
| Tensile Strength, MPa | 49.7 | 52.6 | 50.4 | 50.1 | 51.6 | 60.8 | 68.3 | 63.8 | 58.9 | 58.0 |
| Elongation at Break, % | 4.3 | 4.5 | 4.05 | 2.8 | 5.15 | 4.2 | 3.7 | 2.8 | 4.8 | 5.0 |
| Impact Peel Str., N/mm | 32.6 | 36.0 | 31.2 | 29.3 | 35.8 | 34.2 | 32.9 | 23.2 | 33.6 | 32.5 |
| Lap Shear Str., MPa | 35.0 | 37.7 | 32.2 | 27.7 | 41.4 | 39.3 | 36.0 | 28.8 | 40.1 | 37.1 |
| Lap Shear Elongation, % | 35.0 | 1.8 | 1.44 | 1.7 | 1.8 | 2.1 | 1.9 | 1.2 | 1.8 | 2.0 |
| Yield stress, 45° C., Pa | 122.4 | 108.4 | 153.6 | 127 | 145.1 | 71.9 | 75.6 | ND | 78.0 | 83.5 |
| Viscosity, 45° C., Pa · s | 33.9 | 32.1 | 46.6 | 155 | 61.5 | 48.2 | 38.7 | ND | 28.9 | 37.1 |

19 20

As with previous examples of the invention, Examples 6-15 demonstrate high elastic moduli, compared with Comparative Samples A, E, F and G, even at high fiber loadings. Impact peel strengths are generally comparable to or better than those of the Comparative Samples, at equivalent fiber loadings.

What is claimed is:

1. A one-component epoxy structural adhesive comprising in admixture:

A) at least one epoxy resin;

B) a reactive toughener containing urethane and/or urea groups and capped isocyanate groups;

C) one or more epoxy curing agents;

D) 5 to 20 weight percent, based on the total weight of the epoxy structural adhesive, of a mineral filler in the form of fibers having a diameter of about 12 μm to 25 μm and an aspect ratio of at least 6, wherein the mineral filler in the form of fibers is wollastonite, and the diameter is D50 as measured by microscopy, and wherein at least 10 weight-% of component D) has an aspect ratio of at least 20 and E) one or more epoxy curing catalysts, wherein the curing agent(s) and epoxy curing catalyst(s) are selected together such that the structural adhesive exhibits a curing temperature of at least 60° C., wherein the curing temperature is the lowest temperature at which the structural adhesive achieves at least 30% of its lap shear strength according to DIN ISO 1465 at full cure within 2 hours.

2. The one-component epoxy structural adhesive of claim 1, wherein the aspect ratio of the mineral filler in the form of fibers is at least 9.

3. The one-component epoxy structural adhesive of claim 1, which contains 40 to 70% by weight of component A), and component A) includes one or more bisphenol diglycidyl ethers having an epoxy equivalent weight of 170 to 400.

4. The one-component epoxy structural adhesive of claim 1, which contains 10 to 30 weight percent of the toughener.

5. The one-component epoxy structural adhesive of claim 1, wherein the isocyanate groups of the toughener are capped with a phenol, polyphenol or aminophenol.

6. The one-component epoxy structural adhesive of claim 1, wherein the toughener is made in a process that includes the steps of forming an isocyanate-terminated prepolymer by reacting an excess of a polyisocyanate with a 300 to 3000 equivalent weight polyol to form a prepolymer, optionally chain-extending the prepolymer and then capping the isocyanate groups of the prepolymer or chain-extended prepolymer.

7. The one-component epoxy structural adhesive of claim 1, wherein the curing agent includes one or more of dicya- ndiamide, methyl guanidine, dimethyl guanidine, trimethyl guanidine, tetramethyl guanidine, methylisobiguanidine, dimethylisobiguanidine, tetramethylisbiguandidine, heptamethylisobiguanidine, hexamethylisobiguanidine, acetoguanamine and benzoguanamine.

8. The one-component epoxy structural adhesive of claim 1, wherein the catalyst includes one or more of p-chlorophenyl-N,N-dimethylurea, 3-phenyl-1,1-dimethylurea, 3,4-dichlorophenyl-N,N-dimethylurea, N-(3-chloro-4-methylphenyl)-N',N'-dimethylurea, benzyldimethylamine, 2,4,6-tris (dimethylaminomethyl) phenol, piperidine, 2-ethyl-2-methylimidazol, N-butylimidazol, 6-caprolactam and 2,4,6-tris (dimethylaminomethyl) phenol.

9. The one-component epoxy structural adhesive of claim 1, which further contains at least one low aspect ratio filler, wherein the aspect ratio of the low aspect ratio filler is 6 or less.

10. The one-component epoxy structural adhesive of claim 1, which is devoid of a rubber that does not contain capped isocyanate groups.

11. The one-component epoxy structural adhesive of claim 1, which exhibits an elastic modulus of at least 2200 MPa when cured for 30 minutes at 180° C. and tested in accordance with DIN EN ISO 527-1.

12. The one-component epoxy structural adhesive of claim 1, which exhibits an elastic modulus of at least 2500 MPa when cured for 30 minutes at 180° C. and tested in accordance with DIN EN ISO 527-1.

13. The one-component epoxy structural adhesive of claim 1, which exhibits a dynamic impact peel strength of at least 20 N/mm when applied between oily 1.0 mm thick HC420LAD+Z100 steel coupons, cured at 180° C. for 30 minutes and then tested at 23° C. in accordance with the ISO 11343 wedge impact method at 23° C.

14. The one-component epoxy structural adhesive of claim 1, which exhibits a dynamic impact peel strength of at least 25 N/mm when applied between oily 1.0 mm thick HC420LAD+Z100 steel coupons, cured at 180° C. for 30 minutes and then tested at 23° C. in accordance with the ISO 11343 wedge impact method at 23° C.

15. The one-component epoxy structural adhesive of claim 1, which exhibits a dynamic impact peel strength of at least 30 N/mm when applied between oily 1.0 mm thick HC420LAD+Z100 steel coupons, cured at 180° C. for 30 minutes and then tested at 23° C. in accordance with the ISO 11343 wedge impact method at 23° C.

16. The one-component epoxy structural adhesive of claim 1 wherein the mineral filler in the form of fibers has a diameter of about 12 μm.

* * * * *